United States Patent
Kamada

(10) Patent No.: US 9,803,069 B2
(45) Date of Patent: Oct. 31, 2017

(54) RUBBER COMPOSITION FOR SIDEWALL OR RIM STRIP OF TIRE, AND PNEUMATIC TIRE

(71) Applicant: Toyo Tire & Rubber Co., Ltd., Osaka-shi, Osaka (JP)

(72) Inventor: Shinsaku Kamada, Osaka (JP)

(73) Assignee: TOYO TIRE & RUBBER CO., LTD., Osaka-shi (JP)

(*) Notice: Subject to any disclaimer, the term of this patent is extended or adjusted under 35 U.S.C. 154(b) by 0 days.

(21) Appl. No.: 15/096,843

(22) Filed: Apr. 12, 2016

(65) Prior Publication Data

US 2016/0304706 A1 Oct. 20, 2016

(30) Foreign Application Priority Data

Apr. 15, 2015 (JP) ................. 2015-083413

(51) Int. Cl.
*C08L 9/00* (2006.01)
*C08L 7/00* (2006.01)

(52) U.S. Cl.
CPC .. *C08L 9/00* (2013.01); *C08L 7/00* (2013.01)

(58) Field of Classification Search
CPC ..................... C08L 9/00; C08L 7/00
See application file for complete search history.

(56) References Cited

FOREIGN PATENT DOCUMENTS

| JP | 2005/206673 A | 8/2005 |
| JP | 2008-150435 A | 7/2008 |
| JP | 2014-15535 A | 1/2014 |
| JP | 2014-210830 | * 11/2014 |
| JP | 2014-210830 A | 11/2014 |

OTHER PUBLICATIONS

Office Action dated Jul. 11, 2017, issued in counterpart Chinese Application No. 201610231777.8, with machine translation. (11 pages).

* cited by examiner

*Primary Examiner* — Robert Harlan
(74) *Attorney, Agent, or Firm* — Westerman, Hattori, Daniels & Adrian, LLP

(57) ABSTRACT

A rubber composition for a sidewall or rim strip of a tire comprises a diene rubber, a hydrocarbon type wax in which the difference (Tm3–Tm1) between a starting point (Tm1) and an end point (Tm3) of a heat absorption peak measured by a differential scanning calorimeter is 40° C. or less, and a processing aid comprising at least one selected from the group consisting of a fatty acid metal salt, a fatty acid amide and a fatty acid ester, in which the difference (Tm3–Tm1) between a starting point (Tm1) and an end point (Tm3) of a heat absorption peak measured by the differential scanning calorimeter is 50° C. or more. The rubber composition can suppress discoloration of a rubber surface due to a wax.

9 Claims, 1 Drawing Sheet

US 9,803,069 B2

RUBBER COMPOSITION FOR SIDEWALL OR RIM STRIP OF TIRE, AND PNEUMATIC TIRE

CROSS-REFERENCE TO RELATED APPLICATIONS

This application is based upon and claims the benefit of priority from the prior Japanese Patent Application No. 2015-83413, filed on Apr. 15, 2015; the entire contents of which are incorporated herein by reference.

BACKGROUND

1. Technical Field

The invention relates to a rubber composition used in a sidewall and/or rim strip of a. tire, and a pneumatic tire using the rubber composition.

2. Related Art

A rubber composition forming a sidewall part or rim strip part of a pneumatic tire contains a wax or an age register in order to suppress deterioration by ozone or ultraviolet rays in the air. Those have a deterioration suppressing effect, but become a factor of poor appearance of a tire by whitening or brown discoloration of a rubber surface.

To suppress whitening of a sidewall part by a wax, JP-A-2014-210830 proposes to add a fatty acid metal salt having the carbon number of from 16 to 20 smaller than the carbon number of a hydrocarbon contained in the most in a wax together with a wax. JP-A-2014-015535 proposes to use a tacky wax comprising an ester of fatty acid having a hydroxyl group in place of a hydrocarbon type wax. However, it was not known that discoloration of a rubber surface can be suppressed by using both a hydrocarbon type wax having a specific melting point and a fatty acid processing aid having a specific melting point.

JP-A-2008-150435 and JP-A-2005-206673 disclose to add a fatty acid processing aid such as a fatty acid metal salt or a fatty acid amide to a rubber composition for a tire together with a hydrocarbon type wax. However, those documents are mainly the technology for establishing both tire performance such as low fuel consumption and processability in a rubber composition for a tread. Those documents do not disclose a combined use of a hydrocarbon type wax having a specific melting point and a fatty acid processing aid having a specific melting point.

SUMMARY

In view of the above, an object of an embodiment is to provide a rubber composition for a sidewall or rim strip of a tire, that can suppress discoloration of a rubber surface due to a wax.

The rubber composition for a sidewall or rim strip of a tire according to this embodiment comprises a diene rubber, a hydrocarbon type wax in which the difference (Tm3−Tm1) between a starting point (Tm1) and an end point (Tm3) of a heat absorption peak measured by a differential scanning calorimeter is 40° C. or less, and a processing aid comprising at least one selected from the group consisting of a fatty acid metal salt, a fatty acid amide, and a fatty acid ester, in which the difference (Tm3−Tm1) between a starting point (Tm1) and an end point (Tm3) of a heat absorption peak measured by the differential scanning calorimeter is 50° C. or more.

The pneumatic tire according to an embodiment uses the rubber composition in a sidewall and/or a rim strip.

Discoloration of a rubber surface can be suppressed by using both the above-described hydrocarbon type wax having a specific inciting point and fatty acid processing aid having a specific melting point.

DETAILED DESCRIPTION

Matters concerning carrying out of embodiments are described below.

The rubber composition according to an embodiment comprises (A) a diene rubber, (B) a hydrocarbon type wax, and (C) a processing aid.

(A) Diene Rubber

Diene rubber as a rubber component is not particularly limited. Examples of the diene rubber that can be used include natural rubber (NR), isoprene rubber (IR), butadiene rubber (BR), styrene-butadiene rubber (SBR), styrene-isoprene rubber, butadiene-isoprene rubber, styrene-butadiene-isoprene rubber, and nitrile rubber (NBR). Those diene rubbers can be used alone or as mixtures of two or more kinds. More preferred diene rubber is at least one selected from the group consisting of natural rubber, isoprene rubber, styrene-butadiene rubber, and butadiene rubber.

As one embodiment, 100 parts by mass of the diene rubber may comprise from 30 to 80 parts by mass of natural rubber and/or isoprene rubber and from 70 to 20 parts by mass of butadiene rubber, and may comprise from 40 to 70 parts by mass of natural rubber and/or isoprene rubber and from 60 to 30 parts by mass of butadiene rubber.

(B) Hydrocarbon Type Wax

The hydrocarbon type wax used has a specific melting point. In detail, a hydrocarbon type wax in which the difference (Tm3−Tm1) between a starting point (Tm1) and an end point (Tm3) of a heat absorption peak measured by a differential scanning calorimeter (DSC) is 40° C. or less is used. A size of crystals can be reduced by using the hydrocarbon type wax having such a peculiar melting point. In detail, it is considered that when the difference between a starting point and an end point of a heat absorption peak is 40° C. or less, crystal growth of a hydrocarbon type wax transferred to a rubber surface is suppressed, and individual crystals becomes small. As a result, crystals become difficult to whiten as compared with the case where large crystals are formed. The difference (Tm3−Tm1) is preferably 30° C. or less, and more preferably 25° C. or less. The lower limit of the difference (Tm3−Tm1) is not particularly limited, and may be, for example, 5° C. or more or 10° C. or more.

Figure 1:
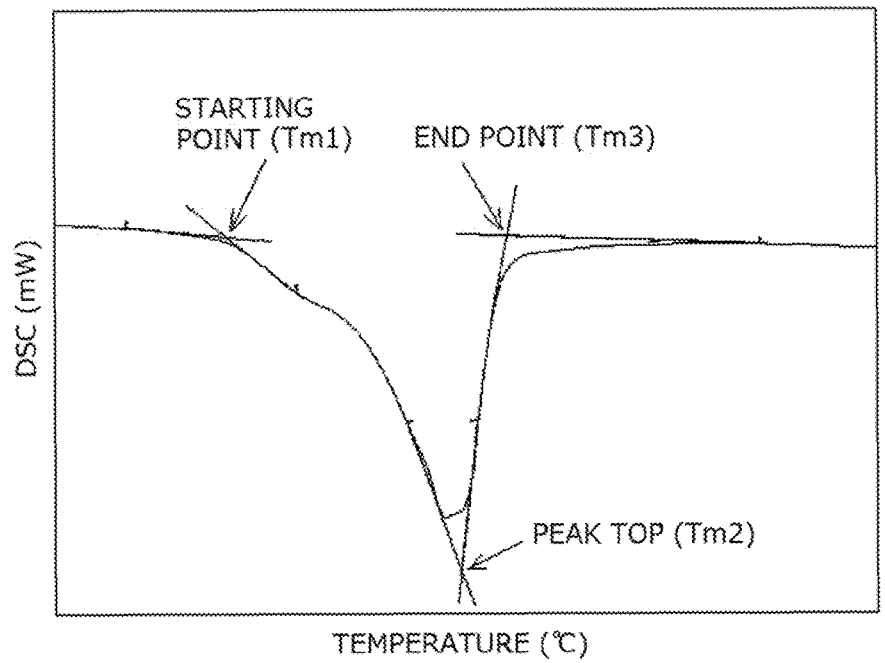
FIG. 1 is a view showing a starting point (Tm1) and an end point (Tm3) of a heat absorption peak in a differential scanning calorimetric curve measured by a differential scanning calorimeter.

The starting point (Tm1) of a heat absorption peak is a starting point of heat absorption in a heat absorption peak caused by melting (a temperature at which melting starts) in a differential calorimetric curve measured by DSC, and is also called an onset temperature. In detail, the starting point (Tm1) is a temperature at an intersection point between a tangent line of a curve in the part depressed to a heat absorption side from the start of heat absorption and a straight line extending a base line (a substantially flat part that is not influenced by melting before the start of heat absorption) at a low temperature side, in a differential calorimetric curve as shown in FIG. 1. The end point (Tm3) of a heat absorption peak is an end point of heat Absorption in the heat absorption peak (a temperature at which melting ends), and is called an endset temperature. In detail, the end point (Tm3) is a temperature at an intersection point between a tangent line of a curve in the part depressed to a heat absorption side from the end of heat absorption and a straight line extending a base line (a substantially flat part after the end of heat absorption) at a high temperature side, in a differential calorimetric curve as shown in FIG. 1.

Peak top temperature (Tm2) of a heat absorption peak of a hydrocarbon type wax is not particularly limited, but is preferably from 50 to 80° C., and more preferably from 55 to 70° C. The peak top temperature (Tm2) used herein is the maximum heat absorption temperature of the heat absorption peak, and is a temperature at an intersection point between tangent lines of curves at both sides reaching the maximum heat absorption point.

Examples of the hydrocarbon type wax include various hydrocarbons such as saturated hydrocarbon, unsaturated hydrocarbon, alicyclic hydrocarbon or aromatic hydrocarbon, and waxes comprising a mixture of two or more kinds thereof Specific examples of the hydrocarbon type wax include petroleum wax (such as paraffin wax), paraffin synthetic wax and polyolefin wax (such as polyethylene wax). Those waxes may be used in one kind alone or as mixtures of two or more kinds thereof The hydrocarbon type wax is preferably petroleum wax, Those hydrocarbon type waxes generally contain hydrocarbons having from 20 to 50 carbon atoms.

A method for preparing the hydrocarbon type wax in which the difference (Tm3−Tm1) of a heat absorption peak is 40° C. or less is not particularly limited. For example, in the case of petroleum wax, fractions by concentrating components having various carbon number distributions are obtained by combining the conventional methods such as a vacuum distillation method, a solvent deoiling method, a perspiration method and a press deoiling method, and those fractions are mixed while adjusting a blending ratio of those fractions such that the difference (Tm3−Tm1) is 40° C. or less. To decrease the difference (Tm3−Tm1), for example, fractions having close carbon numbers are mixed such that a carbon number distribution becomes small.

The amount of the hydrocarbon type wax added is not particularly limited, but is preferably from 1 to 5 parts by mass, and more preferably from 1 to 3 parts by mass, per 100 parts by mass of the diene rubber. When the amount of the hydrocarbon type wax added is 1 part by mass or more, the effect of improving ozone resistance can be enhanced. Furthermore, when the amount of the hydrocarbon type wax added is 5 parts by mass or less, excessive blooming on a rubber surface can be suppressed.

(C) Processing Aid

Fatty acid type processing aid having a specific melting point is used as the processing aid. In detail, a processing aid comprising at least one selected from the group consisting of a fatty acid metal salt, a fatty acid amide, and a fatty acid ester, in which the difference (Tm3−Tm1) between a starting point (Tm1) and an end point (Tm3) of a heat absorption peak measured by a differential scanning calorimeter is 50° C. or more, is used. The hydrocarbon type wax transferred to a rubber surface can be uniformized by using the processing aid. In detail, when the difference (Tm3−Tm1) of a heat absorption peak of the processing aid is 50° C. or more, flexibility is imparted to the processing aid when bloomed on a rubber surface, crystals of the hydrocarbon type wax can be smoothly covered with the processing aid, and the wax can be uniformized on the rubber surface. As a result, whitening of the rubber surface due to the wax can be suppressed. Furthermore, for example, in the case where an age resister has been added to a rubber composition, discoloration such as brown discoloration of a rubber surface due to the age resister can be suppressed.

The difference (Tm3−Tm1) of a heat absorption peak of the processing aid is preferably 55° C. or more, and more preferably 60° C. or more. The upper limit of this difference (Tm3−Tm1) is not particularly limited. For example, the upper limit may be 100° C. or less or may be 80° C. or less. Peak top temperature (Tm2) of the heat absorption peak. of the processing aid is not particularly limited, but is preferably from 60 to 130° C., and more preferably from 80 to 120° C. The definitions of the starting point (Tm1), end point (Tm3) and peak top temperature (Tm2) of the heat absorption peak of the processing aid are the same as those of the hydrocarbon type wax described above with reference to FIG. 1, and description thereof is omitted.

A method for preparing the processing aid in which the difference (Tm3−Tm1) in the heat absorption peak is 50° C. or more is not particularly limited, and for example, includes a method of widening a carbon number distribution of a constituent fatty acid or a method of combining two or more kinds selected from the group consisting of a fatty acid metal salt, a fatty acid amide and a fatty acid ester.

The relationship between the heat absorption peak of the processing aid and the heat absorption peak of the hydrocarbon type wax is not particularly limited. To enhance the effect of this embodiment, the relationship is preferably set as the following (1) to (3). The relationship may be set such that any one or more of those (1) to (3) is satisfied, and may be set such that all of those (1) to (3) is satisfied.

(1) It is preferred that the end point (Tm3) of the heat absorption peak of the processing aid is higher than the end point (Tm3) of the heat absorption peak of the hydrocarbon type wax. More preferably, the end point (Tm3) of the heat absorption peak of the processing aid is higher than the end point (Tm3) of the heat absorption peak of the hydrocarbon type wax by 30° C. or more, and still more preferably by 40 to 70° C.

(2) It is preferred that the temperature range of the heat absorption peak of the processing aid overlaps the temperature range of the heat absorption peak of the hydrocarbon type wax. More preferably, the overlapped temperature range is 5° C. or more, and still more preferably, the overlapped temperature range is from 10 to 30° C. The temperature range of the heat absorption peak is a temperature range in which the starting point (Tm1) is the lower limit and the end point (Tm3) is the upper limit.

(3) It is preferred that the starting point (Tm1) of the heat absorption peak of the processing aid is higher than the starting point (Tm1) of the heat absorption peak of the hydrocarbon type wax.

Fatty acid of the fatty acid metal salt used as the processing aid is not particularly limited, and examples of the fatty acid include saturated fatty acids and/or unsaturated fatty acids having from 5 to 36 carbon atoms. Saturated fatty acids and/or unsaturated fatty acids having from 8 to 24 carbon atoms are more preferred. Specific examples of the fatty acid include octanic acid, capric acid, lauric acid, myristic acid, palmitic acid, stearic acid, arachidic acid, oleic acid, linoleic acid and linolenic acid. Examples of the metal salt include alkali metal salts such as sodium salt or potassium salt; alkaline earth metal salts such as magnesium salt or calcium salt; and transition metal salts such as zinc salt, cobalt salt or copper salt. Of those salts, alkali metal salts and/or alkaline earth metal salts are preferred, and potassium salt and/or calcium salt are more preferred.

Fatty acid of the fatty acid amide is not particularly limited. Similar to the fatty acid metal salt, examples of the fatty acid of the fatty acid amide include saturated fatty acids and/or unsaturated fatty acids having from 5 to 36 carbon atoms, and saturated fatty acids and/or unsaturated fatty acids having from 8 to 24 carbon atoms are more preferred. The fatty acid amide may be a primary amide such as stearic acid amide, and may be a secondary amide or a tertiary amide, obtained by reacting a fatty acid compound with a primary amine or a secondary amine, such as monoethanolamine or diethanolamine. The fatty acid amide may be alkylenebisfatty acid amide having two fatty acid residues. In the case of alkylenebisfatty acid amide, the carbon number of the fatty acid is the carbon number per one amide group of the fatty acid. The alkylene is preferably methylene or ethylene.

Fatty acid of the fatty acid ester is not particularly limited. Similar to the fatty acid metal salt, examples of the fatty acid of the fatty acid ester include saturated fatty acids and/or unsaturated fatty acids having from 5 to 36 carbon atoms, and saturated fatty acids and/or unsaturated fatty acids having from 8 to 24 carbon atoms are more preferred. Alcohol of the fatty acid ester is not particularly limited, and may be not only monohydric alcohols such as methanol, ethanol, propanol or butanol, but also dihydric or more alcohols such as glycol, glycerin, erythritol or sorbitol.

A mixture of (C1) a fatty acid metal salt and (C2) a fatty acid amide and/or a fatty acid ester (hereinafter the fatty acid amide and fatty acid ester are collectively called a fatty acid derivative) is preferably used as the processing aid. In this case, the fatty acid metal salt is particularly effective to suppress whitening of a rubber surface, and the fatty acid derivative is particularly effective to suppress brown discoloration of a rubber surface. Therefore, the effect of suppressing whitening and brown discoloration can be further enhanced. The fatty acid metal salt (C1) used is preferably salts other than zinc salt, and more preferably alkaline earth metal salts and/or alkali metal salts such as calcium salt and/or potassium salt. The fatty acid derivative (C2) used is more preferably the fatty acid amide. The ratio between the fatty acid metal salt (C1) and the fatty acid derivative (C2) is not particularly limited, but is preferably C1/C2=2/8 to 8/2 in mass ratio.

The amount of the processing aid added is not particularly limited, but is preferably from 0.5 to 10 parts by mass, and more preferably from 2 to 8 parts by mass, per 100 parts by mass of the diene rubber, from the standpoint that discoloration suppression effect by the use thereof in combination with the hydrocarbon type wax is enhanced.

The rubber composition according to this embodiment can further contain various additives generally used in a rubber composition, such as a filler, a age resister, zinc flower, stearic acid, vulcanizing agent or a vulcanization accelerator, other than the above-described components.

Carbon black and/or silica can be added as the filler, The carbon black is not particularly limited, and can use furnace carbon blacks of various grades, such as SAF grade (N100 Series), ISAF grade (N200 Series), HAF grade (N300 Series) and FEF grade (N500 Series) (those are ASTM grade), that are used as a reinforcing agent for a rubber. The silica is not particularly limited, but wet silica (hydrated silicic acid) is preferred. The amount of the filler added is not particularly limited, but is preferably from 10 to 150 parts by mass, more preferably from 20 to 120 parts by mass, and still more preferably from 30 to 100 parts by mass, per 100 parts by mass of the diene rubber.

Examples of the age resister include amine type age resisters such as N-phenyl-N'(1,3-dimethyibutyl)-p-phenylenediamine (6PPD) or N-isopropyl-N'-phenyl-p-phenylenediamine (IPPD), phenol type age resisters such as 2,6-di-tert-butyl-4-methylphenol (DTBMP), and sulfur type age resisters such as 2-mercaptobenzimidazole. Of those age resisters, the amine type age registers are preferred, an aromatic secondary amine type age resister is more preferred, and p-phenylenediamine type age resister is particularly preferred, 6PPD may be used as one embodiment. The amount of the age resister added is not particularly limited, but is preferably from 1 to 10 parts by mass, and more preferably from 2 to 5 parts by mass, per 100 parts by mass of the diene rubber.

Examples of the vulcanizing agent include sulfur components such as powdered. sulfur, precipitated sulfur, colloidal sulfur, insoluble sulfur and highly dispersible sulfur. The amount of the vulcanizing agent added is not particularly limited, but is preferably from 0.1 to 10 parts by mass, and more preferably from 0.5 to 5 parts by mass, per 100 parts by mass of the diene rubber.

The rubber composition according to the embodiment can be prepared by kneading the necessary components according to the conventional method using a mixing machine generally used, such as Banbury mixer, a kneader or rolls. Specifically, other additives excluding a vulcanizing agent and a vulcanization accelerator are added to a diene rubber together with a hydrocarbon type wax and a processing aid, followed by mixing, in a first mixing step. A vulcanizing agent and a vulcanization accelerator are then added to the mixture thus obtained, followed by mixing, in a final mixing step. Thus, a rubber composition can be prepared.

The rubber composition thus obtained can be used as a rubber composition constituting a sidewall and/or rim strip of a pneumatic tire.

Figure 2:
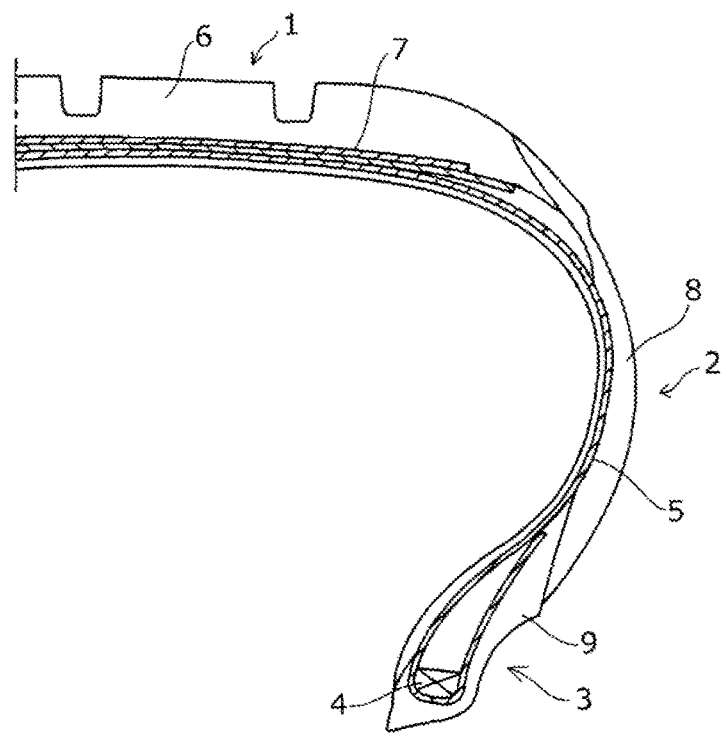
FIG. 2 is a half cross-sectional view showing one example of a pneumatic tire.

FIG. 2 is a view showing one example of a pneumatic tire. The pneumatic tire comprises a tread part 1, a pair of right and left sidewall parts 2 extending in a tire inward radial direction from both edges of the tread part, and a pair of right and left bead parts 3 provided inside in a tire radial direction of the sidewall parts 2. A carcass ply 5 toroidally extending between a pair of bead cores 4 embedded in the pair of bead parts 3 is embedded in the pneumatic tire. A belt 7 is provided between the carcass ply 5 and a tread rubber 6 at the outer circumferential side in a radial direction of the carcass ply 5 in the tread part 1. The pneumatic tire further comprises a sidewall rubber 8 forming a tire outer surface of the sidewall part 2 provided at a tire outer surface side of the carcass ply 5 in the sidewall part 2, and a rim strip 9 forming a tire outer surface of the bead part 3 provided so as to cover a region in contact with a rim flange in the bead part 3. The rim strip 9 is a rubber layer provided outside the bead part 3 in continuation with a lower edge of the sidewall rubber 8. Those sidewall rubber 8 and rim strip 9 form an outer surface of a pneumatic tire, and are therefore required to suppress discoloration of a rubber surface. For this reason, the rubber composition according to this embodiment is preferably used.

The pneumatic tire can be manufactured according to the conventional method using the rubber composition according to this embodiment. For example, an unvulcanized sidewall rubber member and/or rim strip rubber member are obtained by molding the rubber composition in a given shape by extrusion processing, and those are combined to other parts, thereby manufacturing a green tire. The green tire obtained is vulcanization-molded at a temperature of, for example, from 140 to 180° C., thereby a pneumatic tire can be manufactured. The pneumatic tire can be applied to pneumatic tires having various sizes for various uses such as for passenger cars or for heavy load of trucks or buses.

EXAMPLES

Examples of this embodiment are described below, but the present invention is not construed as being limited to those examples.

Banbury mixer was used. Compounding ingredients other than sulfur and a vulcanization accelerator were added to and kneaded with a diene rubber according to the formulations (parts by mass) shown in Table 1 below in a first mixing step (discharge temperature: 160° C.). Sulfur and a vulcanization accelerator were added to and kneaded with the mixture obtained above in a final mixing step (discharge temperature: 90° C.). Thus, a rubber composition was prepared. The rubber composition can be used in a sidewall rubber and also in a rim strip. The details of each component in Table 1 are as follows.

Natural rubber: RSS#3

Butadiene rubber: "BR150" manufactured by Ube Industries, Ltd.

Carbon black: HAF, "SEAST 3" manufactured by Tokai Carbon Co., Ltd.

Age resister: "ANTIGEN 6C" manufactured by Sumitomo Chemical Co., Ltd.

Zinc flower: "Zinc Flower #1" manufactured by Mitsui Mining & Smelting Co., Ltd.

Stearic acid: "Industrial Stearic Acid" manufactured by Kao Corporation

Sulfur: "5% Oil-treated Powdered Sulfur" manufactured by Tsurumi Chemical Industry Co., Ltd.

Vulcanization accelerator: "NOCCELER NS-P" manufactured by Ouchi Shinko Chemical Industrial. Co., Ltd.

Processing aid 1: "AFLUX 16" manufactured by Rhein Chemie (a mixture of 50% of fatty acid calcium salt and 50% of fatty acid ethanol amine. Tm1: 53° C., Tm2; 113° C., Tm3: 120° C., Tm3-Tm1: 67° C.)

Processing aid 2: "ULTRA FLOW 160" manufactured by Performance Additive (a mixture of fatty acid calcium salt and fatty acid amide, Tm1: 61° C. Tm2: 99° C., Tm3: 113° C., Tm3-Tm1.: 52° C.)

Processing aid 3: "AKTIPLAST PP" manufactured by Rhein Chemie (fatty acid zinc salt, Tm1: 92° C. Tm2: 104° C., Tm3: 107° C., Tm3-Tm1: 16° C.)

Processing aid 4: "ULTRA FLOW 500" manufactured by Performance Additive (fatty acid zinc salt, Tm1: 81° C. Tm2: 108° C., Tm3: 114° C., Tm3-Tm1; 33° C.)

Wax 1: Paraffin wax adjusted to X=35.0 mass %, Y-9.8 mass % and Z-2.6 mass %.

Content of linear saturated hydrocarbon: 73 mass %, iso component content: 27 mass % (Tm1: 49° C., Tm2: 61° C., Tm3: 68° C., Tm3-Tm1: 19° C.)

Wax. 2: Paraffin wax adjusted to X-35.5 mass %. Y-6.5 mass % and Z-3.8 mass %. Content of linear saturated hydrocarbon: 70 mass %, iso component content: 30 mass % (Tm1: 32° C., Tm2: 63° C., Tm3: 69° C., Tm3-Tm1: 36° C.)

Wax 3: "Ozo-0355" manufactured by Nippon Seiro Co., Ltd. (Tm1: 33° C. Tm2: 71° C., Tm3: 77° C., Tm3-Tm1: 44° C.)

Wax 4: "Hi-Mic-1080" manufactured by Nippon Seiro Co., Ltd. (Tm1: 46° C. Tm2: 64° C., Tm3: 90° C., Tm3-Tm1: 44° C.)

In the above waxes, X is a content (mass %) of a linear saturated hydrocarbon having from 25 to 30 carbon atoms in 100 mass % of a wax, Y is a content (mass %) of a linear saturated hydrocarbon having from 35 to 40 carbon atoms in 100 mass % of a wax, and Z is a content (mass %) of a linear saturated hydrocarbon having 45 or more carbon atoms in 100 mass % of a wax. Carbon number distribution of a wax is a value measured up to 390° C. from 180° C. under the conditions of carrier gas: helium, flow rate: 4 ml/min and temperature. rising rate: 15° C./min using a polyimide-coated capillary column and using capillary gas chromatograph (GC) as a measurement instrument.

"DSC 8220" manufactured by Mettler Toledo was used for the measurement of Tm1, Tm2 and Tm3 of the waxes and processing aids. Those were heated up to 250° C. from 25° C. in the air in a temperature rising rate of 10 K/min to obtain a differential calorimetric curve, and Tm1, Tm2 and Tm3 were calculated from the curve.

Tm1: Temperature at an intersection point between a straight line extending a base line at a low temperature side to a high temperature side and a tangent line drawn at a point that a gradient becomes maximum in a curve at a low temperature side of a melting peak (heat absorption peak)

Tm2: Temperature at an intersection point between a tangent line drawn at a point that a gradient becomes maximum in a curve at a low temperature side of a melting peak and a tangent line drawn at a point that a gradient becomes maximum in a curve at a high temperature side of a melting peak Tm3: Temperature at an intersection point between a straight line extending a base. line at a high temperature side to a low temperature side and a tangent line drawn at a point that a gradient becomes maximum in a curve at a high temperature side of a melting peak However, in the case where a stepwise changing part (the part depressed at the beginning to a heat absorption side from a base line at a low temperature side in the example of FIG. 1) is observed in a curve of a melting peak as in FIG. 1, an intersection point between a tangent line drawn at a point that a gradient of a curve in the stepwise changing part becomes maximum and a base line was used for the calculation of Tm1 and Tm3.

Each rubber composition was vulcanized at 160° C. for 20 minutes to prepare each test piece, and appearance (whitening), appearance (brown discoloration) and ozone resistance of each test piece were measured. Each evaluation method is as follows.

Appearance (whitening): A vulcanized rubber piece was placed in an oven adjusted to a temperature of 40° C., and was allowed to stand therein for 3 weeks. Thereafter, the surface of the vulcanized rubber piece was visually observed, and appearance (whitening) was evaluated by the following criteria.

A: Surface is black, and discoloration is not substantially observed

B: Surface is slightly discolored white

C: Surface is somewhat discolored white

D: Surface is discolored white

Appearance (brown discoloration): A vulcanized rubber piece was placed in Weatherometer Ci4000 (conditions: 38° C./50% RH, radiant intensity: 60W/m$^2$) manufactured by ATLUS, and was allowed to stand therein for 300 hours. Thereafter, the surface of the vulcanized rubber piece was visually observed, and appearance (brown discoloration) was evaluated by the following criteria.

A: Surface is black, and discoloration is not substantially observed

B: Surface is slightly discolored brown
C: Surface is somewhat discolored brown
D: Surface is discolored dark brown Ozone resistance: A vulcanized rubber piece was installed in an ozone weather meter under the condition of 25% elongation, and was allowed to stand therein in the environment of ozone concentration of 100 pphm and temperature of 50° C. for 24 hours. Thereafter, generation state of cracks was visually observed, and ozone resistance was evaluated by the following criteria.

A: No generation of cracks
B: Cracks that cannot be confirmed with the naked eye but can be confirmed with a magnifying glass of 10 magnifications are generated
C: Cracks of 1 mm or less are generated
D: Cracks exceeding 1 mm are generated The results obtained are shown in Table 1. A processing aid is not added in Comparative Example 1. Therefore, whitening by blooming of a wax was observed, and brown discoloration by an age resister was also observed. A processing aid in which the difference (Tm3−Tm1) in a heat absorption peak is small was used in Comparative Examples 2 and 3. Therefore, whitening by a wax could not be suppressed and further whitening and brown discoloration by blooming of a processing aid were observed. A wax in which the difference (Tm3−Tm1) in a heat absorption peak is large was used in Comparative Examples 4 and 5. Therefore, crystal growth of a wax transferred to a rubber surface was large and the effect of suppressing whitening was not obtained. On the other hand, Examples 1 to 5 concurrently use a wax in which the difference (Tm3−Tm1) in a heat absorption peak is small and a processing aid in which the difference (Tm3−Tm1) in a heat absorption peak is large. Therefore, whitening and brown discoloration of a rubber surface could be suppressed while exhibiting ozone resistance by a wax.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rubber composition for a sidewall or rim strip of a tire, comprising:
   a diene rubber,
   a hydrocarbon wax in which the difference (Tm3−Tm1) between a starting point (Tm1) and an end point (Tm3) of a heat absorption peak measured by a differential scanning calorimeter is 40° C. or less, and
   a processing aid comprising at least one selected from the group consisting of a fatty acid metal salt, a fatty acid amide, and a fatty acid ester, in which the difference (Tm3−Tm1) between a starting point (Tm1) and an end point (Tm3) of a heat absorption peak measured by the differential scanning calorimeter is 50° C. or more.

2. The rubber composition according to claim 1, wherein the processing aid comprises a mixture of (i) the fatty acid metal salt and (ii) the fatty acid amide and/or the fatty acid ester.

3. The rubber composition according to claim 1, comprising 100 parts by mass of the diene rubber, from 1 to 5 parts by mass of the hydrocarbon wax, and from 0.5 to 10 parts by mass of the processing aid.

4. The rubber composition according to claim 1, wherein the end point of the heat absorption peak of the processing aid is higher than the end point of the heat absorption peak of the hydrocarbon wax.

5. The rubber composition according to claim 1, wherein a temperature range of the heat absorption peak of the processing aid overlaps a temperature range of the heat absorption peak of the hydrocarbon wax.

6. The rubber composition according to claim 1, wherein the starting point of the heat absorption peak of the processing aid is higher than the starting point of the heat absorption peak of the hydrocarbon wax.

TABLE 1

|  | Com. Ex. 1 | Com. Ex. 2 | Com. Ex. 3 | Com. Ex. 4 | Com. Ex. 5 | Ex. 1 | Ex. 2 | Ex. 3 | Ex. 4 | Ex. 5 |
| --- | --- | --- | --- | --- | --- | --- | --- | --- | --- | --- |
| Formulation (Parts by mass) | | | | | | | | | | |
| Natural rubber | 50 | 50 | 50 | 50 | 50 | 50 | 50 | 50 | 50 | 50 |
| Butadiene rubber | 50 | 50 | 50 | 50 | 50 | 50 | 50 | 50 | 50 | 50 |
| Processing aid 1 |  |  |  | 5 | 5 | 5 |  |  | 5 | 2 | 9 |
| Processing aid 2 |  |  |  |  |  |  | 5 |  |  |  |
| Processing aid 3 |  | 5 |  |  |  |  |  |  |  |  |
| Processing aid 4 |  |  | 5 |  |  |  |  |  |  |  |
| Wax 1 | 2 | 2 | 2 |  |  | 2 | 2 |  | 1 | 3 |
| Wax 2 |  |  |  |  |  |  |  | 2 |  |  |
| Wax 3 |  |  |  | 2 |  |  |  |  |  |  |
| Wax 4 |  |  |  |  | 2 |  |  |  |  |  |
| Carbon black | 60 | 60 | 60 | 60 | 60 | 60 | 60 | 60 | 60 | 60 |
| Age resister | 2 | 2 | 2 | 2 | 2 | 2 | 2 | 2 | 2 | 2 |
| Zinc flower | 3 | 3 | 3 | 3 | 3 | 3 | 3 | 3 | 3 | 3 |
| Stearic acid | 2 | 2 | 2 | 2 | 2 | 2 | 2 | 2 | 2 | 2 |
| Sulfur | 2 | 2 | 2 | 2 | 2 | 2 | 2 | 2 | 2 | 2 |
| Vulcanization accelerator | 1 | 1 | 1 | 1 | 1 | 1 | 1 | 1 | 1 | 1 |
| Evaluation | | | | | | | | | | |
| Appearance (Whitening) | C | D | D | C | C | A | A | B | A | B |
| Appearance (Brown discoloration) | C | D | C | B | B | A | A | A | B | A |
| Ozone resistance | C | B | B | B | B | A | A | A | A | A |

7. The rubber composition according to claim 1, wherein a peak top temperature (Tm2) of the heat absorption peak of the hydrocarbon wax is from 50 to 80° C., and a peak top temperature (Tm2) of the heat absorption peak of the processing aid is from 60 to 130° C.

8. The rubber composition according to claim 1, further comprising an amine age resister.

9. A pneumatic tire having a sidewall and/or a rim strip comprising the rubber composition according to claim 1.

* * * * *